United States Patent [19]
Eck et al.

[11] 3,990,207
[45] Nov. 9, 1976

[54] TIEDOWN DEVICE

[75] Inventors: Leonard F. Eck, McPherson, Kans.; William K. Hagerty, Alhambra, Calif.

[73] Assignee: Kansas Jack, Inc., McPherson, Kans.

[22] Filed: Mar. 1, 1976

[21] Appl. No.: 662,571

[52] U.S. Cl. .................................. 52/704; 52/162; 52/166; 52/298; 85/74
[51] Int. Cl.² ...................... E04B 1/38; E02D 5/74
[58] Field of Search ............. 52/704, 159, 162, 163, 52/164, 165, 166, 155, 298, 23, 706, 711, 710; 85/74, 75

[56] References Cited
UNITED STATES PATENTS

| | | | |
|---|---|---|---|
| 2,052,793 | 9/1936 | Peirce | 85/74 |
| 2,277,449 | 3/1942 | Paine | 52/706 |
| 2,660,276 | 11/1953 | McKee | 52/159 |
| 2,957,279 | 10/1960 | McNair | 52/706 |
| 3,114,528 | 12/1963 | Forest | 85/74 |
| 3,403,594 | 10/1968 | Newell | 85/74 |
| 3,550,343 | 12/1970 | Buske | 52/298 |
| 3,908,977 | 9/1975 | Roepke et al. | 85/74 |

*Primary Examiner*—Price C. Faw, Jr.
*Assistant Examiner*—Robert C. Farber
*Attorney, Agent, or Firm*—Fishburn, Gold & Litman

[57] ABSTRACT

A tiedown device for holding one end portion of a working element, such as a chain or cable, intended to be anchored or tied down. The tiedown device includes a tubular body member having a plurality of slots opening at one end of the body member so as to separate and define a plurality of cantilevered segments each capable of being forcibly urged outwardly into gripping relationship with a surrounding structure, such as a concrete floor slab, by a wedge member within the body member and having an exterior surface in engagement with the interior surface of the cantilevered segments. A top insert is positioned within the body member and has an end portion with one surface thereof in engagement with a portion adjacent the other end of the body member. Tension transmitting members extend between and are in engagement with the wedge member and the top insert and the tension transmitting members are capable of moving the wedge member toward the other end of the body member thereby effecting the gripping relationship of the body member and the surrounding structure. The end portion of the top insert has a slot therein capable of receiving and holding the one end portion of the working element. A cover member has a projection received in the slot in the end portion of the top insert and the cover member defines an abutment capable of preventing the working element from being removed from the top insert.

10 Claims, 7 Drawing Figures

U.S. Patent  Nov. 9, 1976  Sheet 2 of 2  3,990,207
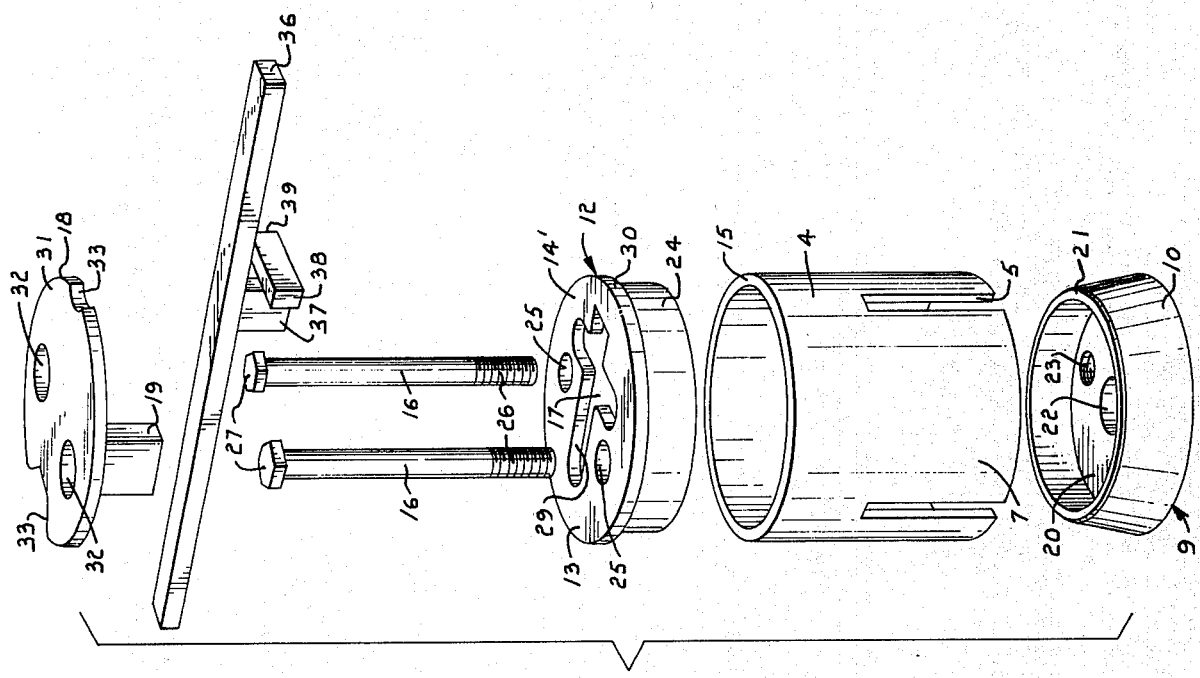
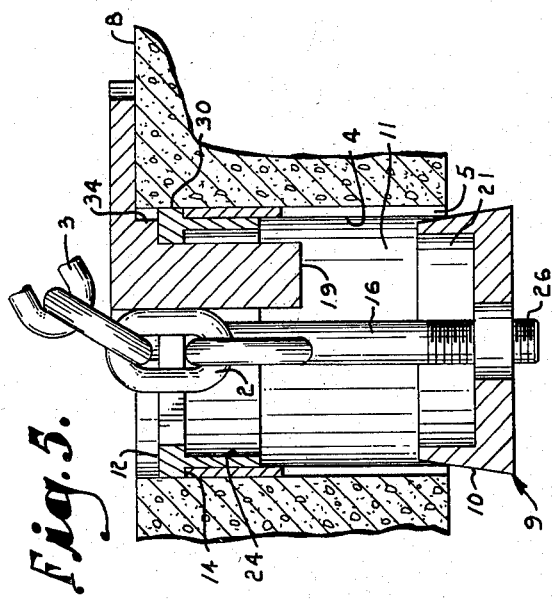
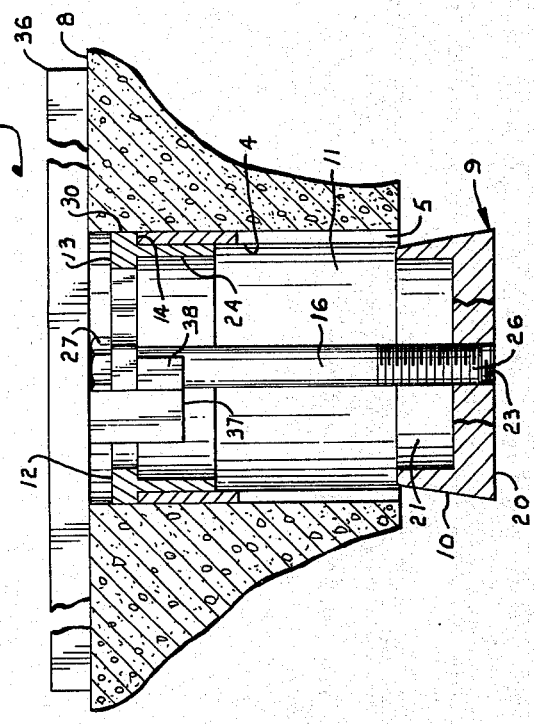

TIEDOWN DEVICE

The present invention relates to tiedown devices used for anchoring one end of a chain or cable and more particularly to a tiedown device having a top member capable of having a tension member connected thereto for anchoring same and having tension transmitting means connected to the top member and to a wedge member whereby any pulling force on the tension member tends to increase the gripping of an anchor sleeve or cylinder to a concrete floor slab.

The tiedown device has tension transmitting members extending between and in engagment with a top insert and a wedge member and capable of moving the wedge member through a bore of a body member so as to deform cantilevered segments in a radial pattern beyond a normal outer diameter of the body member to effect gripping relationship between the tiedown device and a surrounding structure.

The principal objects of the present invention are: to provide a tiedown device for holding one end portion of a working element, such as a chain or cable, intended to be anchored or tied down; to provide such a tiedown device wherein an anchor sleeve thereof is capable of being accurately positioned in a bore hole in a concrete floor slab and remaining in position when a pulling force is applied to the tiedown device; to provide such a tiedown device having a top member capable of having a tension member connected thereto for anchoring same and having tension transmitting means connected to the top member and to a wedge member whereby any pulling force on the tension member tends to increase the gripping of an anchor sleeve or cylinder to a concrete floor slab; to provide such a tiedown device capable of resisting a pulling force from any direction; to provide such a tiedown device characterized by elimination of the requirement for a chain rest therein; to provide such a tiedown device capable of being installed in a thinner floor slab than conventional tiedown devices; to provide such a tiedown device capable of being prepositioned in a concrete floor slab; to provide such a tiedown device capable of having a body member or anchor sleeve preanchored or expanded in the floor slab; to provide such a tiedown device capable of resisting a pulling force of up to and including eighty thousand pounds (80,000 lbs.), with at least a 50% safety factor; to provide such a tiedown device having a cover member positioned substantially flush with the floor surface; to provide such a tiedown device capable of increasing the gripping relationship of a body member with a surface of a bore hole in a concrete floor slab as a pulling force on the tiedown increases; to provide such a tiedown device having a body member and a body expanding member connected to a top member which is capable of having a pulling element connected thereto so that a pulling force applied to the pulling element is transmitted to the body expanding member to increase the force holding the body member in the concrete slab; to provide such a tiedown device wherein the pulling element is easily secured to or removed from the top member and when in use a lock member maintains the connection; and to provide such a tiedown device which is easily installed, economical to manufacture, durable in construction, positive in operation, and particularly well adapted for the proposed use.

Other objects and advantages of this invention will become apparent from the following description taken in connection with the accompanying drawings wherein are set forth, by way of illustration and example, certain embodiments of this invention.

The drawings constitute a part of the specification and include an exemplary embodiment of the present invention and illustrate various objects and features of the tiedown device.

FIG. 5 is an enlarged transverse sectional view through the tiedown device similar to FIG. 4 except showing one end portion of a working element retained therein.

FIG. 6 is an enlarged transverse sectional view through the tiedown tool supporting the tiedown device prior to expanding an anchor sleeve or body member.

FIG. 7 is an enlarged exploded perspective view of the components of the tiedown device and a positioning tool.

Figure 2:
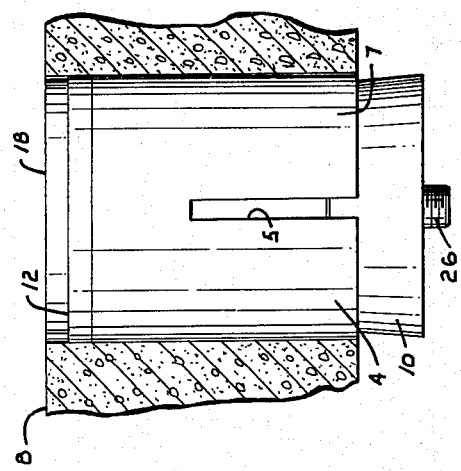
FIG. 2 is an enlarged side elevational view of the tiedown device and shown with a cover member in a storage position.
Figure 4:
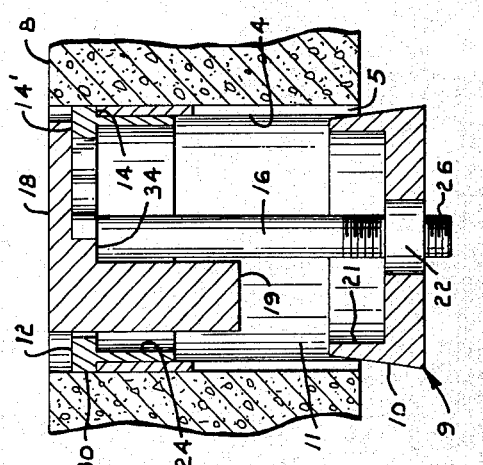
FIG. 4 is an enlarged transverse sectional view through the tiedown device and taken on line 4—4 of FIG. 3 and shown with the cover member in a storage position.

As required, detailed embodiments of the present invention are disclosed herein, however, it is understood that the disclosed embodiments are merely exemplary of the invention which may be embodied in various forms. Therefore, specific structural and functional details disclosed herein are not to be interpreted as limiting but merely as a basis for the claims and as a representative basis for teaching one skilled in the art to variously employ the present invention in virtually any appropriately detailed structure.

Referring more in detail to the drawings:

In the disclosed embodiment of the present invention, the reference numeral 1 designates generally a tiedown device for holding one end portion 2 of a working element 3, such as a chain or cable, intended to be anchored or tied down. The tiedown device 1 has a top member or insert capable of having the working element 3 connected to or retained in engagement therewith for anchoring same. The tiedown device 1 has tension transmitting means connected to the top member and to a wedge member so that any pulling force on the working element 3 tends to increase the gripping of an anchor sleeve or body member 4 to a concrete floor slab.

The illustrated body member 4 has a plurality of slots 5 opening at one end 6 of the body member 4 so as to separate and define a plurality of cantilevered segments 7 each characterized by being capable of being forcibly urged outwardly into gripping relationship with a surrounding structure 8, such as a concrete floor slab, by a body expanding or wedge member 9 within the body member 4 and having an exterior surface 10 in engagement with an interior surface 11 of the cantilevered segments 7. A top member or insert 12 is positioned within the body member 4 and has an end wall or portion 13 with one surface 14 thereof in engagement with the other end 15 of the body member 4. Tension transmitting members 16 extend between and are in engagement with the wedge member 9 and the top insert 12 and the tension transmitting members 16 are capable of moving the body expanding or wedge member 9 toward the other end 15 of the body member 4 thereby effecting the gripping relationship of the body member 4 and the surrounding structure 8. The end wall or portion 13 of the top insert 12 has a slot 17 therein capable of receiving and holding the one end portion 2 of the working element 3. A cover member 18 has a lock or projection 19 received in the slot 17 in the end portion 13 of the top insert 12 and the cover member 18 defines an abutment capable of preventing the working element 3 from being removed from the top insert 12.

It is conventional for tiedown devices to have body members with portions thereof expandable into gripping relation with the facing surface of a bore hole in the floor slab in response to moving of a wedge member by a pull force on a working element. However, body members of conventional tiedown devices are subject to movement in the floor slab prior to being firmly anchored. Conventional tiedown devices have portions which extend above a floor surface even when in a non-use position.

The illustrated tubular body member 4 is a cylindrical member with the slots 5 circumferentially spaced and extending longitudinally from the one end 6 thereof to define the cantilevered segments 7 which are capable of being forcibly urged outwardly into gripping relationship with the floor slab 8. As the wedge member 9 is moved through the bore of the body member 4, the segments 7 are deformed outwardly in a radial pattern beyond the normal outer diameter of the body member 4 to imbed in the surrounding structure or soil under the floor slab 8.

The interior surface 11 of the body member 4 may be tapered from the one or lower end 6 towards the upper or other end 15 of the body member 4 thereby guiding the wedge or body expanding member 9 into the bore through the body member 4 and providing a larger surface area of contact between the interior surface 11 of the body member 4 and the exterior surface 10 of the wedge member 9.

The wedge or body expanding member 9 is positioned within the body member 4 and has an exterior surface 10 in cooperative inclined engagement with the interior surface 11 of the segments 7 to expand same in response to relative longitudinal movement of the wedge member 9. The illustrated wedge member 9 has an end wall 20 and a side wall 21 extending therefrom. The end wall 20 has a center bore 22 therethrough to permit escape of water entering the tiedown device 1 during floor cleaning operations and the like. The end wall 20 also has a plurality of apertures 23 therein, for a purpose later described.

The top insert 12 is positioned within the body member 4 and has the one surface 14 of the end portion or wall 13 thereof in engagement with a portion adjacent the other end 15 of the body member 4. The illustrated top inert 12 has a rib or flange 24 depending from the end wall 13 and received within the bore through the body member 4. The flange 24 is preferably substantial in length, such as up to one-half the diameter of the bore in the body member 4 and it functions as a guide to center the top insert 12 in the body member 4. The flange 24 particularly provides support and strength for the end wall or portion 13 of the top insert 12 during application of a pulling force to the end wall 13 to resist deformation, as later described.

The end wall 13 has a plurality of apertures 25 therethrough and apertures 25 are equal in number to the number of the apertures 23 in the end wall 20 of the wedge member 9. The apertures 25 through the end wall 13 are alignable with the apertures 23 so that the tension transmitting members 16 may be mounted in the tiedown device 1.

The tiedown device 1 has means engaging the top insert 12 and the wedge member 9 for moving the wedge member 9 towards the other end 15 of the body member 4 and thereby effecting the gripping relationship of the body member 4 and the surrounding structure or floor slab 8. It is desirable that the means for effecting the gripping relationship of the body member 4 and the floor slab 8 be flush with or below the upper surface of the floor slab 8, therefore, the apertures 23 in the end wall 20 of the body expanding member 9 are threaded and the apertures in the end wall 13 of the top member 12 are unthreaded or plain. In the illustrated embodiment, the tension transmitting members 16 each have one end portion 26 thereof threaded to be received in respective threaded apertures 23 in the end wall 20 of the wedge member 9. The tension transmitting members 16 are illustrated as bolts each having a head portion 27 in engagement with the other surface 14' of the end wall 13 of the top insert 12 whereby tightening the bolts or tension transmitting members 16 moves the wedge member 9 toward the other end 15 of the body member 4 and thereby expands the cantilevered segments 7 of the body member 4.

The tiedown device 1 has means on and in engagement with the top member or insert 12 for holding or securing the one end portion 2 of the working element 3 intended to be anchored. In the illustrated embodiment, the slot 17 in the end wall 13 of the top member or insert 12 has an entrance portion 28 capable of permitting passage therethrough of the one end portion 2 of the working element 3. The slot 17 has a holding or securing portion 29 which has a transverse dimension less than one of the dimensions of the one end portion 2 of the working element 3 whereby a pulling force on the working element 3 moves the one end portion 2 thereof into engagement with the one surface 14 of the end wall 13 of the top insert 12.

The end wall 13 of the top insert 12 is in engagement with a portion of the body member 4 adjacent the other end 15 of the body member 4. In the illustrated embodiment, the end wall 13 is annular and has a peripheral edge portion 30 extending outwardly from the cylindrical portion 24 of the top insert 12 and the peripheral edge portion 30 is in engagement with the other end 15 of the body member 4.

The tiedown device 1 includes means for securing or holding the one end portion 2 of the working element 3 intended to be anchored and preventing removal of same from the top insert 12. In the illustrated embodiment, the cover member 18 has the projection 19 extending therefrom and the projection is capable of being received in the holding portion 29 of the slot 17 in the end portion or wall 13 of the top insert 12. The cover member 18 is engageable by the working element for preventing movement of the one end portion 2 of the working element 3 into and through the entrance portion 28 of the slot 17 in the end wall 13 of the top insert 12.

In the illustrated embodiment, the cover member 18 has a generally planar portion 31 positioned in the bore hole in the floor slab 8 and in covering relation with the end wall 13 of the top insert 12 when the tiedown device 1 is not in use. The planar portion 31 has a plurality of apertures 32 therein positioned and arranged to each receive therein a head portion 27 of a respective one of the tension transmitting members 16. The planar portion 31 is a generally annular member and has a plurality of notches 33 in the peripheral edge thereof to permit engagement of the cover member 18 to remove same from the opening in the floor slab 8. One of the notches 33 in the planar portion 31 of the cover member 18 receives therein the working element 3 when the pulling force thereon is toward the cover member 18 and parallel with the holding portion 29 of the slot 17 in the top member end wall 13.

The projection 19 extends from the planar portion 31 of the cover member 18 and has a width and thickness to be received in the holding portion 29 of the slot 17 in the end wall 13 of the top insert 12 and extends at least partially across the entrance portion 28 of the slot 17 in the top member end wall 13. When the cover member 18 is in the storage position, as illustrated in FIGS. 1 to 4 inclusive, the projection 19 is received in one portion of the holding portion 29 of the slot 17 in the end wall 13 of the top insert 12. When the cover member 18 is in position for retaining or securing the one end portion 2 of the working element 3 in working position, as seen in FIG. 5, the projection 19 is received in an other portion of the holding portion 29 and extends at least partially across the entrance portion 28 of the slot 17 in the end wall 13 of the top insert 12. One edge of the projection 19 is in engagement with an end of the holding or securing portion 29 of the slot 17 in the end wall 13 of the top member 12 so that the cover member 18 serves as an abutment for the working element 3 when the pulling force on the working element 3 is toward the cover member 18 and parallel with the holding portion 29 of the slot 17.

It is desirable that when the tiedown device 1 is in use that the lower surface of the planar portion 31 of the cover surface of the planar portion 31 of the cover member 18 be in engagement with and supported on the upper surface of the floor slab 8, therefore, the lower surface of the planar portion 31 has a rib 34 depending therefrom and the rib 34 is engageable with the upper surface 14' of the top insert 12 to raise the lower surface of the planar portion 31 to be flush or level with the upper surface of the floor slab 8. In the in-use position the planar portion 31 of the cover member is level and the engagement of the rib 34 with the upper surface 14' of the top member 12 and the engagement of the lower surface of the planar portion 31 with the upper surface of the floor slab 8 whereby excessive forces are not applied to an edge of the bore hole in the floor slab 8 which would tend to crush or break said bore hole edge.

When the cover member 18 is in the storage position, the rib 34 is received in the entrance portion 28 of the slot 17 in the top member end wall 13 and the projection 19 is received in the holding portion 29 of the slot 17 in the top member end wall 13.

Assembly of the tiedown device 1 is simple and easy to accomplish. The rib or flange portion 24 of the top insert 12 is positioned within the body member 4 and the peripheral edge portion 30 of the end wall 13 of the top insert 12 is positioned in engagement with the other end 15 of the body member 4. The tension transmitting members 16 are positioned in the apertures 25 through the end wall 13 of the top insert 12. The body expanding or wedge member 9 is positioned adjacent the lower or one end 6 of the body member 4 and the threaded end portions 26 of the tension transmitting members 16 are moved into the threaded apertures 23 through the end wall 20 of the wedge member 9. The body member 4, wedge member 9, and top insert 12 are positioned in the bore hole in the floor slab 8 with the top insert 12 supported on a positioning tool 36 and positioned below the upper surface of the floor slab 8. The positioning tool 36 is illustrated as an elongated bar having one surface engageable with the upper surface of the floor slab 8. The positioning tool 36 has a rib or guide portion 37 received in the retaining portion 29 of the slot 17 and ears 38 and 39 extending laterally in opposite directions from the guide rib 37. The ears 38 and 39 are spaced from the one surface of the positioning tool 36 a distance such that the top of the head portion 27 of each of the bolts or tension transmitting members 16 and the upper surface of the planar portion 31 of the cover member 18 will be level or flush with the upper surface of the floor slab 8 when the positioning tool 36 is in engagement with the upper surface of the floor slab 8. Mounting the tiedown device 1 on the positioning tool 36 includes aligning the guide portion or rib 37 with the retaining portion of the slot 17 and aligning the ears 38 and 39 with the entrance portion 28 of the slot 17 in the end wall 13 of the top member 12. The rib 37 and the ears 38 and 39 are then moved through the respective portions of the slot 17 and the positioning tool 36 is moved parallel with the holding portion 29 of the slot 17 thereby moving the ears 38 and 39 laterally from the entrance portion 28 so that the top member 12 is then supported on the ears 38 and 39. The tension transmitting members 16 are then tightened to move the wedge member 9 upwardly through the bore of the body member 4. The segments 9 are thereby deformed in a radial pattern beyond the normal outer diameter of the body member 4 to imbed in the surrounding terrain or structure, such as the floor slab 8. The cover member 18 is then positioned in covering relation with the top insert 12 and with the projection 19 in the holding portion 29 of the slot 17 in the end wall 13 of the top insert 12. The tiedown device 1 is thereby in storage condition.

Figure 1:
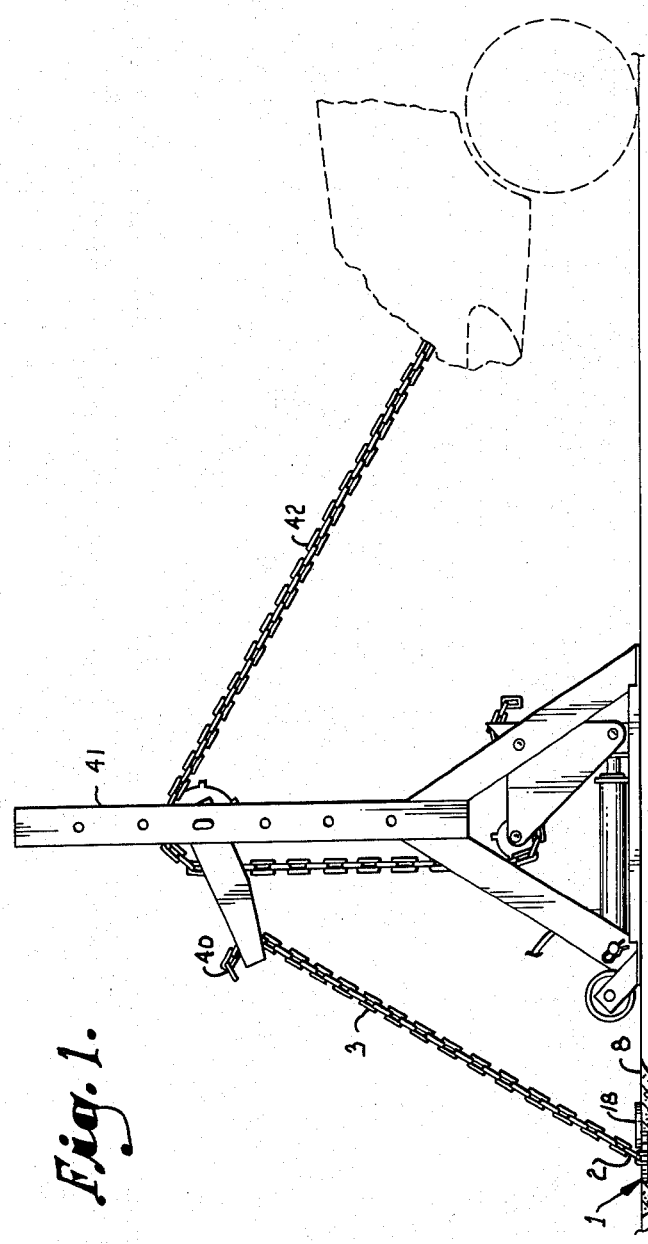
FIG. 1 is a side elevational view of a tiedown device embodying features of the present invention and shown mounted in a concrete floor slab and having a tension member or working element connected to the tiedown device and to a vehicle frame.
Figure 3:
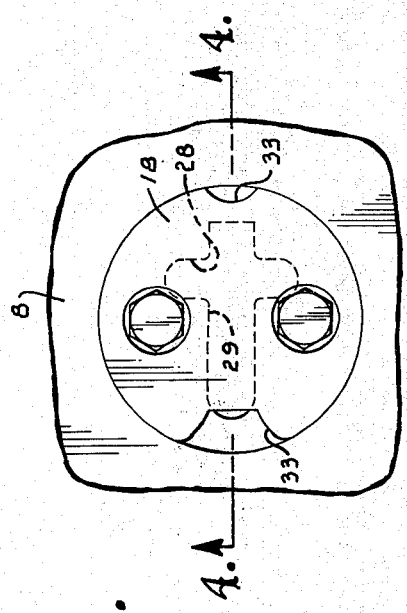
FIG. 3 is an enlarged top plan view of the tiedown device.

When it is desired to use the tiedown device 1, the cover member 18 is removed and the one end portion 2 of the working element 3 is moved through the entrance portion 28 and the working element 3 is then moved along the holding portion 29 of the slot 17 in the end wall 13 of the top insert 12. In the illustrated embodiment, the working element 3 is a chain and one link thereof is moved through the entrance portion 28 of the slot 17 until the next adjacent link thereof is positioned to be moved along the holding portion 29 of the slot 17. The cover member is positioned with the projection 19 in the holding portion 21 of the slot 17 so as to extend at least partially across the entrance portion 28 of the slot 17 and thereby at least partially close same and prevent movement of the one or lower link of the chain into and through the entrance portion 28 of the slot 17 in the end wall 13 of the top insert 12. FIG. 1 illustrates a typical use of the tiedown device 1 wherein the working element 3 has the other end portion 40 thereof secured to a power post or tower 41. One end portion of a flexible member 42 is secured on the power post 41 and the other end portion of the flexible member 42 is connected or secured to a damaged body or frame of a vehicle, such as a car, truck, or the like, which is to be straightened. The power post 41 includes suitable power operated extensible means, such as a hydraulic cylinder, and suitable levers having the flexible member 42 connected or secured thereto. Operation of the extensible means tends to move the power post 41 toward the vehicle while the working element 3 holds the power post 41 in position whereby the working element 3 is in tension and the tension or pulling force is transmitted by means of the bolts 16 to the wedge member 9 thereby increasing the gripping relationship of the body member 4 with the surface defining the bore hole in the floor slab 8.

It is to be understood that while we have illustrated and described one form of our invention, it is not to be limited to the specific form or arrangement of parts herein described and shown.

What we claim and desire to secure by Letters Patent is:

1. A tiedown device comprising:
   a. a tubular body member having opposite ends and a plurality of slots opening at one end of the body member so as to separate and define a plurality of cantilevered segments each characterized by being capable of being forcibly urged outwardly into gripping relationship with a surrounding structure;
   b. a wedge member within said body member and having an exterior surface in cooperative inclined engagement with said cantilevered segments to expand same in response to relative longitudinal movement thereof;
   c. a top insert within said body member and having an end portion thereof in engagement with a portion adjacent the other end of said body member;
   d. means engaging said top insert and said wedge member for moving said wedge member toward the other end of said body member and thereby effecting the gripping relationship of said body member and the surrounding structure; and
   e. means on and in engagement with said top insert for holding one end portion of a working element intended to be anchored.

2. A tiedown device as set forth in claim 1 wherein said means for moving said wedge member toward the other end of said body member includes a plurality of bolts each having one end portion thereof in threaded connection with said wedge member and a head portion in engagement with the other surface of the end portion of said top insert whereby tightening said bolts moves said wedge member toward the other end of said body member and thereby expands said cantilevered segments of said body member.

3. A tiedown device as set forth in claim 1 wherein said means for holding one end portion of the working element includes:
   a. means on the end portion of said top insert defining a slot therein having an entrance portion and a holding portion, said entrance portion being characterized by being capable of permitting passage therethrough of the one end portion of the working element, said holding portion having a transverse dimension less than one dimension of the one end portion of the working element whereby a pulling force on the working element moves the one end portion thereof into engagement with the one surface of the end portion of said top insert; and
   b. means received in said entrance portion of said slot and engageable by the working element for preventing movement of the one end portion thereof into and through said entrance portion of said slot.

4. A tiedown device as set forth in claim 3 wherein said means for preventing movement of the one end portion of the working element into and through said entrance portion of said slot includes:
   a. a cover member having a generally planar portion positioned in covering relation with the one end portion of said top insert; and
   b. a projection extending from said cover member and having a width and thickness to be received in said holding portion and extends at least partially across said entrance portion of said slot in the end portion of said top insert.

5. A tiedown device as set forth in claim 1 wherein said:
   a. top insert includes a flange portion extending from the end portion thereof and received in said body member; and
   b. said end portion of said top insert has a peripheral edge portion extending outwardly from said flange portion and engageable with the other end of said body member.

6. A tiedown device as set forth in claim 1 wherein:
   a. said body member has the interior surface thereof tapered to define a frusto-conical cavity capable of being engaged by the exterior surface of said wedge member;
   b. said wedge member has an end wall and a side wall extending therefrom;
   c. said top insert includes a flange portion extending from the end portion thereof and received in said body member; and
   d. said means for moving said wedge member toward the other end of said body member includes a plurality of bolts each having one end portion thereof in threaded connection with said end wall of said wedge member and a head portion in engagement with the other surface of the end portion of said top insert whereby tightening said bolts moves said wedge member toward the other end of said body member and thereby expands said cantilevered segments of said body member.

7. A tiedown device as set forth in claim 6 wherein said means for holding one end portion of the working element includes:
   a. means on the end portion of said insert defining a slot therein having an entrance portion and a holding portion, said entrance portion being characterized by being capable of permitting passage therethrough of the one end portion of the working element, said holding portion having a transverse dimension less than one dimension of the one end portion of the working element whereby a pulling force on the working element moves the one end portion thereof into engagement with the one surface of said top insert; and
   b. means received in said entrance portion of said slot and engageable by the working element for preventing movement of the one end portion thereof into and through said entrance portion of said slot.

8. A tiedown device as set forth in claim 7 wherein said means for preventing movement of the one end portion of the working element into and through said entrance portion of said slot includes:

a. a cover member having a generally planar portion positioned in covering relation with the one end portion of said top insert; and
b. a projection extending from said cover member and having a width and thickness to be received in said holding portion and extends at least partially across said entrance portion of said slot in the end portion of said top insert.

9. A tiedown device comprising:
a. a tubular body member having opposite ends and a plurality of circumferentially spaced longitudinally extending slots opening at one end of the body member so as to separate and define a plurality of cantilevered segments each characterized by being capable of being forcibly urged outwardly into gripping relationship with a surrounding structure;
b. a wedge member at least partially within said body member and having a side wall with an exterior surface in cooperative inclined engagement with said cantilevered segments to expand same in response to relative longitudinal movement thereof, said wedge member having an end wall positioned at one end of said side wall thereof;
c. a top insert having a flange portion positioned within said body member and having an end portion with one surface thereof in engagement with a portion adjacent the other end of said body member;
d. means extending between and engaging said end portion of said top insert and said end wall of said wedge member for moving said wedge member toward the other end of said body member and thereby effecting the gripping relationship of said body member and the surrounding structure; and
e. means on and in engagement with said end portion of said top insert for holding one end portion of a working element intended to be anchored.

10. A tiedown device as set forth in claim 9 wherein:
a. said means for holding one end portion of the working element includes:
   1. means on the end portion of said insert defining a slot therein having an entrance portion and a holding portion, said entrance portion being characterized by being capable of permitting passage therethrough of the one end portion of the working element, said holding portion having a transverse dimension less than one dimension of the one end portion of the working element whereby a pulling force on the working element moves the one end portion thereof into engagement with the one surface of said one end portion of said top insert; and
   2. means received in said entrance portion of said slot and engageable by the working element for preventing movement of the one end portion thereof into and through said entrance portion of said slot; and
b. said means for preventing movement of the working element into and through said entrance portion of said slot includes:
   1. a cover member having a generally planar portion positioned in covering relation with the one end portion of said top insert; and
   2. a projection extending from said cover member and having a width and thickness to be received in said holding portion and extending at least partially across said entrance portion of said slot in the end portion of said top insert.

* * * * *